Dec. 17, 1940.   C. M. SELBY   2,225,184
FURNACE CONTROL
Filed Sept. 2, 1939   2 Sheets-Sheet 1

INVENTOR.
CHARLES M. SELBY
BY Carroll R. Taber
ATTORNEY.

Dec. 17, 1940.  C. M. SELBY  2,225,184
FURNACE CONTROL
Filed Sept. 2, 1939   2 Sheets-Sheet 2

INVENTOR.
CHARLES M. SELBY
BY Carroll R. Taber
ATTORNEY.

Patented Dec. 17, 1940

2,225,184

UNITED STATES PATENT OFFICE 2,225,184

FURNACE CONTROL

Charles M. Selby, Holland, Mich., assignor to Holland Furnace Company, Holland, Mich., a corporation of Michigan Application September 2, 1939, Serial No. 293,171

7 Claims. (Cl. 126—110)

This invention relates to controls for air circulating systems for furnaces. More specifically, the invention resides in an arrangement of switches in a fan motor circuit whereby the motor may be controlled either manually or automatically without either the manual or automatic control interfering with the operation of the other control.

In furnaces having forced air circulating systems it is customary to provide a switch in the fan motor circuit for controlling the motor, and operate the switch by means of a thermostat located within the furnace jacket in heat exchanging relation to the furnace bonnet. The switch is closed by expansion of the thermostat upon the bonnet reaching a predetermined temperature. Thus, the fan will not be placed in operation until the furnace reaches the desired temperature, and as a result, the fan will not circulate cool air within the space to be heated. Such an arrangement has the disadvantage, however, particularly in coal fired furnaces, of maintaining the fan in operation after the room has reached the desired temperature, because the fan bonnet is at a temperature higher than that required to close the switch in the motor circuit. The continued forcing of hot air into the room causes the latter to overheat.

This invention overcomes the aforementioned difficulty by inserting a second manually controlled switch into the motor circuit to stop the fan motor when the room reaches the desired temperature. However, in order that the motor will again go into operation when the room temperature falls below that required, the switches are interconnected by means of a mechanical lost motion linkage. Thus, when the furnace cools to the point where the thermostatically controlled switch is open, the other switch in the motor circuit is closed, and when the thermostatic switch is again closed the fan will operate properly.

It is accordingly an object of this invention to provide a manual control for a circulating fan motor which is adapted to break the motor circuit, but which does not interfere with the proper automatic operation of the thermostatic switch. Another object of the invention is to provide a device for manually closing the manually controlled switch, if the latter is open, while the thermostatic switch is still closed and has not automatically closed the manually controlled switch. Still another object of the invention is to provide a remote control means for actuating the manually controlled switch.

These objects and others ancillary thereto will become more apparent in the specification when read in connection with the accompanying drawings, in which—

Figure 1:
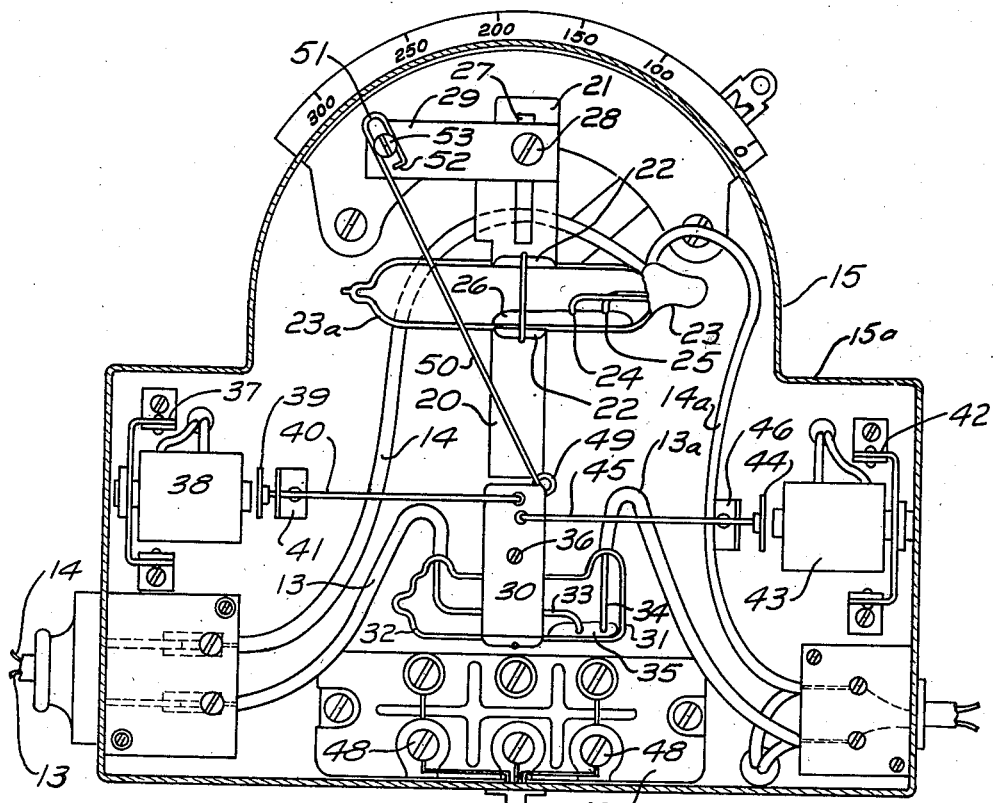
Figure 1 is a front elevational view of the control box with the cover removed to show the interior construction.
Figure 2:
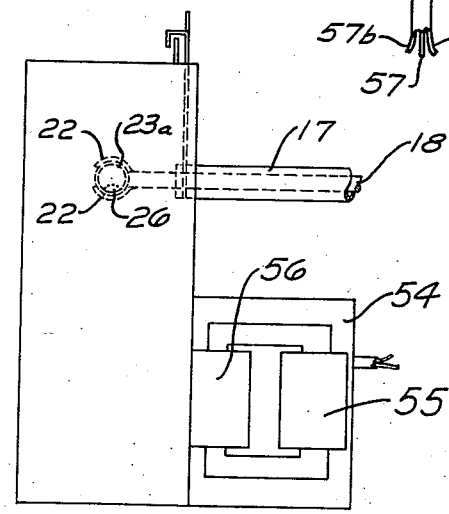
Figure 2 is a side elevation of the control box shown in Figure 1.

The invention is shown as applied to a conventional coal fired hot air furnace 10. The furnace is provided with a circulating fan 11 of any conventional type driven by an electric motor 12. The motor is connected by conductors 13, 13a, 14 and 14a through the control box 15 to a suitable 110 volt line 16.

Figure 3:
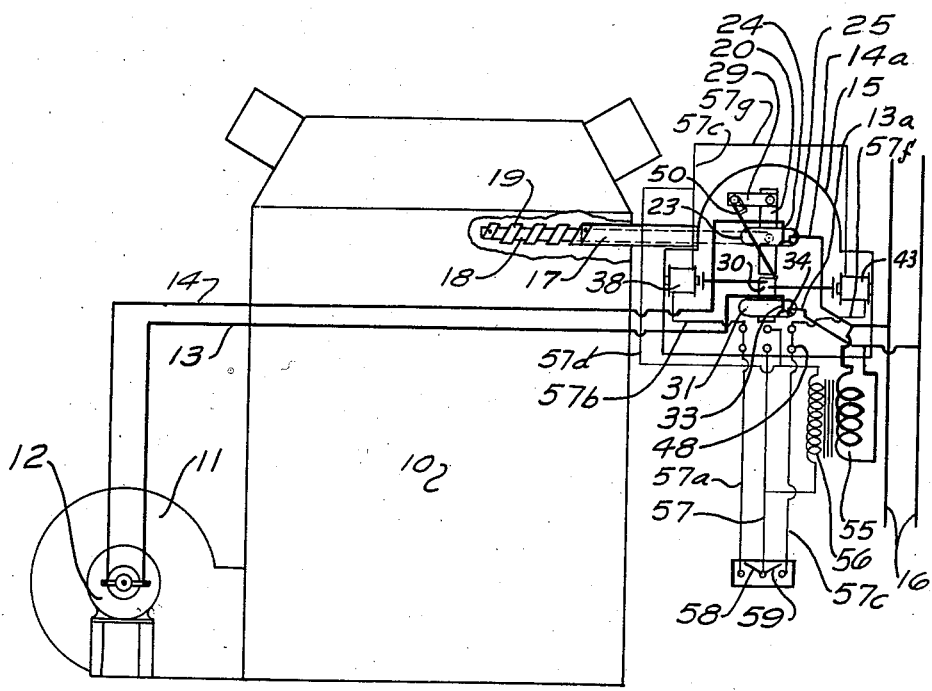
Figure 3 is a diagrammatic view of a heating system embodying this invention and showing the wiring diagram for the controls.

The control box 15 which has an outer housing 15a of sheet metal is secured by any suitable means to the outer jacket of the furnace 10. Secured to the back of the box 15 is a tubular sleeve 17 which extends into the furnace jacket, as shown in Figure 3. Within the sleeve 17 is a shaft 18 to the free end of which is attached a helically wound bimetallic strip 19. The other end of the bimetallic strip is rigidly secured to the end of the sleeve 17 within the furnace. The outer end of the shaft 18 extends into the control box 15 and is secured to a switch cradle 20. This cradle consists of an upright metal strip 21 carrying a pair of lugs 22 which receive a sealed glass tube 23a of a conventional mercury switch 23. The switch includes a pair of contacts 24 and 25 and a globule of mercury 26.

The upper end of the metal strip 21 is slotted as at 27. A bar 29 extending at right angles to the axis of the strip is secured to the latter by means of a bolt 28 passing through the slot 27. By loosening the bolt 28 and sliding it in the slot 27 the bar 29 may be adjusted vertically and fastened in any set position by again tightening the bolt.

Directly below the cradle 20 is a cradle 30 which carries a second mercury switch 31. This switch is generally similar to the previously described switch having a sealed glass tube 32, a pair of contacts 33 and 34, and a globule of mercury 35 therein. The cradle is pivoted on the back of the housing 15a by means of a screw 36.

The upper end of the cradle 30 has an eye 49 to which is pivotally secured a link 50. The opposite end of the link 50 is looped at 51 and its free end bent toward the shank of the link as at 52. A machine screw 53 passes through the loop 51 and is secured to the plate 29 in a manner to allow the loop to reciprocate relative to the plate 29 and screw 53.

Mounted adjacent the left hand side of the housing 15a is a support 37 formed of metal strips which carries an electromagnet 38. A small iron disk 39 is attached to a rod 40 passing through a guide 41 mounted on the back wall of the housing 15a. The rod 40 is pivotally attached at its inner end to the cradle 30.

Similarly, at the opposite side of the housing 15a is a support 42 carrying an electromagnet 43. An iron plate 44 is connected to a rod 45 pivotally secured at its inner end to the cradle 30. The rod 45 passes through a guide 46, also secured to the housing.

On the back of the housing 15a is a conventional step down transformer 54 having a primary 55 and secondary 56. The secondary voltage of this transformer when used with a 110 volt source of supply is preferably 20 volts.

The housing is also provided with a connection plate 47 of insulating material having six contact screws 48 thereon for the proper connection of the various parts.

The wiring diagram of the control is shown in Figure 3. The conductors 13 and 14 connect the motor with the terminals 33 and 24 of the switches 31 and 23 respectively. The other terminals 34 and 25 are connected by conductors 13a and 14a respectively to the 110 volt line 16.

The primary 55 of the transformer 54 is also connected to the line 16. One terminal of the secondary 56 of the transformer is connected by conductor 57 to the common terminal of a pair of push button switches 58 and 59. The switches are manually controlled and preferably located in a position to be conveniently accessible from the room whose temperature is to be regulated.

The switch 58 is connected by conductors 57a and 57b to one terminal of electro-magnet 38. The other terminal of the electro-magnet 38 is connected by conductors 57c and 57d to the other terminal of the transformer secondary 56. Switch 59 is connected by conductors 57e and 57f to one of the terminals of the electro-magnet 43. The other terminal of the electro-magnet 43 is connected by conductors 57g and 57d to the other terminal of the secondary 56.

It will thus be seen that with the mercury switches 23 and 31 in their horizontal positions, as shown in Figures 1 and 3, the motor circuit is closed. It will also be evident that cradle 30 may be tilted to the left by closing the switch 58, and thereby energizing electro-magnet 38 to pull the disk 39 toward the electro-magnet. When the switch 31 is tilted to the left it may be tilted back to its horizontal position by closing switch 59 and thereby energizing electro-magnet 43.

Figure 5:
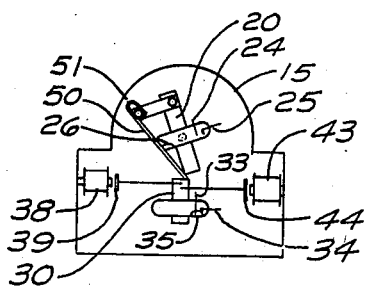
Figure 5 is a diagrammatic view similar to Figure 4 showing the thermostatically controlled switch in open position and the manually closed switch in closed position.
Figure 4:
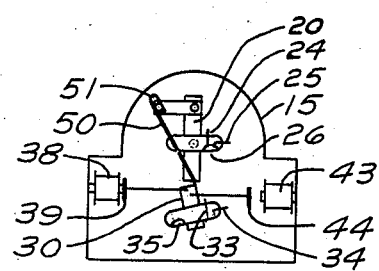
Figure 4 is a diagrammatic front elevational view of the control box showing the manually operated switch in open position and the thermostatically controlled switch in closed position.

When the switches are in the position shown in Figure 1, both are closed, and the fan motor is operating. If at any time it is desired to cut off the current of the motor and thereby stop the circulation of warm air, it is only necessary to press the push button switch 58. This closes the circuit of the electro-magnet 38 which attracts the plate 39 toward it, rotates the cradle 30 in a counter-clockwise direction and opens the switch 31. The motor will then cease operating. In this position the parts are as shown in Figure 4. Eventually the furnace bonnet will cool to the position where the bimetallic strip 19 will rotate the switch 23 in a counter-clockwise direction, thereby opening the motor circuit in another place. The counter-clockwise rotation of the cradle will cause the screw 53 to strike the inturned end 52 of the link 50 and push the cradle 30 from its tilted position, as shown in Figure 4, into the upright position shown in Figure 5. The switch 31 will then be closed and switch 23 will be opened. It will thus be apparent that the apparatus is in condition to operate when the bimetallic strip 19 again rotates the switch 23 to the operating position shown in Figure 1.

Occasionally after the switch 31 has been opened by means of the push button 58 and electro-magnet 38, it may be desired to again furnish heat from the furnace before the furnace bonnet has cooled to a point where the automatic switch 23 and cradle 20 has been rotated sufficiently to close the switch 31. In this event it is only necessary to close the push button switch 59. The closing of this switch energizes the electromagnet 43, draws the metallic disk 44 toward it, and thereby brings the switch back to its closed position. The fan will then operate in its normal manner. The last mentioned switch 59 and its associated electromagnet 43 is not intended to, and cannot start the motor when the switch 23 is in its opened position.

It will be apparent that the invention described herein is capable of eliminating overheating of the space to be heated which occurs in previous systems wherein the entire operation of the fan is controlled solely by an automatic switch, such as switch 23.

The scope of the invention is indicated in the appended claims.

I claim:

1. In an air circulation system having a heat exchanger, a fan, a motor for driving the fan, connections between the motor and a source of electric current constituting a motor circuit, a switch in the motor circuit operable to open and close the latter, thermostatic means located in heat exchanging relation to the heat exchanger and connected to said switch for actuating the same upon a predetermined change in the temperature of the heat exchanger, a second switch in said motor circuit, manually controlled means for opening said switch, and means connecting said switches whereby when said first mentioned switch is opened the second mentioned switch is closed.

2. In an air circulation system having a heat exchanger, a fan, a motor for driving the fan, connections between the motor and a source of electric current constituting a motor circuit, a switch in the motor circuit operable to open and close the latter, thermostatic means located in heat exchanging relation to the heat exchanger and connected to said switch for actuating the same upon a predetermined change in the temperature of the heat exchanger, a second switch in said motor circuit, manually controlled electro-magnetic means for opening said switch, and means connecting said switches whereby when said first mentioned switch is opened the second mentioned switch is closed.

3. In an air circulation system having a heat exchanger, a fan, a motor for driving the fan, connections between the motor and a source of electric current constituting a motor circuit, a switch in the motor circuit operable to open and close the latter, thermostatic means located in heat exchanging relation to the heat exchanger and connected to said switch for actuating the same upon a predetermined change in the temperature of the heat exchanger, a second switch in said motor circuit, manually controlled means for opening said switch, means connecting said switches whereby when said first mentioned switch is opened the second mentioned switch is closed, and manually controlled means for closing said second switch.

4. In an air circulation system having a heat exchanger, a fan, a motor for driving the fan, connections between the motor and a source of electric current constituting a motor circuit, a switch in the motor circuit operable to open and close the latter, thermostatic means located in heat exchanging relation to the heat exchanger and connected to said switch for actuating the same upon a predetermined change in the temperature of the heat exchanger, a second switch in said motor circuit, manually controlled means for opening said switch, and a lost motion linkage connecting said switches whereby when said first mentioned switch is opened the second mentioned switch is closed.

5. In an air circulating system having a heat exchanger, a fan, a motor for driving the fan, connections between the motor and a source of electric current constituting a motor circuit, a switch in the motor circuit operable to open and close the latter, thermostatic means located in heat exchanging relation to the heat exchanger and connected to said switch for actuating the same upon a predetermined change in the temperature of the heat exchanger, a second switch in said motor circuit, electrical means for opening said switch, and means connecting said switches whereby when said first mentioned switch is opened the second mentioned switch is closed.

6. In an air circulating system having a heat exchanger, a fan, a motor for driving the fan, connections between the motor and a source of electric current constituting a motor circuit, a switch in the motor circuit operable to open and close the latter, thermostatic means located in heat exchanging relation to the heat exchanger and connected to said switch for actuating the same upon a predetermined change in the temperature of the heat exchanger, a second switch in said motor circuit, electro-magnetic means for opening said switch, and means connecting said switches whereby when said first mentioned switch is opened the second mentioned switch is closed.

7. In an air circulating system having a heat exchanger, a fan, a motor for driving the fan, connections between the motor and a source of electric current constituting a motor circuit, a switch in the motor circuit operable to open and close the latter, thermostatic means located in heat exchanging relation to the heat exchanger and connected to said switch for actuating the same upon a predetermined change in the temperature of the heat exchanger, a second switch in said motor circuit, electrical means for opening said switch, and a lost motion linkage connecting said switches whereby when said first mentioned switch is opened the second mentioned switch is closed.

CHARLES M. SELBY.